(12) United States Patent
Koehler et al.

(10) Patent No.: US 11,175,721 B2
(45) Date of Patent: Nov. 16, 2021

(54) POWER DELIVERY SMOOTHING IN DEVICE STATE TRANSITIONS

(71) Applicant: Hewlett-Packard Development Company, L.P., Spring, TX (US)

(72) Inventors: Duane A Koehler, Vancouver, WA (US); Robert Yraceburu, Vancouver, WA (US); Francisco Alcazar, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/733,797

(22) PCT Filed: Aug. 31, 2018

(86) PCT No.: PCT/US2018/049245
§ 371 (c)(1),
(2) Date: Oct. 28, 2020

(87) PCT Pub. No.: WO2020/046394
PCT Pub. Date: Mar. 5, 2020

(65) Prior Publication Data
US 2021/0055781 A1 Feb. 25, 2021

(51) Int. Cl.
*G06F 1/32* (2019.01)
*G06F 1/3287* (2019.01)
(Continued)

(52) U.S. Cl.
CPC .......... *G06F 1/3287* (2013.01); *G06F 1/3284* (2013.01); *G06F 1/3293* (2013.01)

(58) Field of Classification Search
CPC ..... G06F 1/3287; G06F 1/3284; G06F 1/3293
See application file for complete search history.

(56) References Cited

U.S. PATENT DOCUMENTS 5,789,723 A   8/1998   Hirst
5,811,764 A *   9/1998   Hirst .................. G03G 15/2003
                                                                                   219/485
(Continued)

FOREIGN PATENT DOCUMENTS

JP    2003087977 A    3/2003
WO    WO2011163103 A3    2/2012
WO    WO-2017193214 A1    11/2017

OTHER PUBLICATIONS

BC Hydro ~ Power Quality—A Guide to Voltage Fluctuation and Light Flicker, Mar. 2005 ~ 12 pages.

*Primary Examiner* — Stefan Stoynov
(74) *Attorney, Agent, or Firm* — Mannava & Kang

(57) ABSTRACT

According to examples, an apparatus may include instructions that may cause the processor to identify, for a first device state, a first set of active components of a device and to determine a first power demand level of the first set of active components for the first device state. The instructions may also cause the processor to determine that the device is to transition from the first device state to a second device state, to determine, for the second device state, a second set of active components of the device having a second power demand level that is within a predefined difference level of the first power demand level, the predefined difference level to smooth power delivery to the device between the first device state and the second device state, and to control application of power to the second set of active components during the second device state.

15 Claims, 6 Drawing Sheets

(51) Int. Cl.
    *G06F 1/3234*     (2019.01)
    *G06F 1/3293*     (2019.01)

(56) References Cited

U.S. PATENT DOCUMENTS

| | | |
|---|---|---|
| 6,393,233 B1 * | 5/2002 | Soulier .............. G03G 15/2003 |
| | | 219/216 |
| 6,573,691 B2 | 6/2003 | Ma et al. |
| 8,119,952 B2 | 2/2012 | Palmer et al. |
| 8,700,347 B2 | 4/2014 | Spanier et al. |
| 8,788,106 B2 | 7/2014 | Stothers et al. |
| 9,413,250 B2 | 8/2016 | Yu |
| 2007/0164714 A1 | 7/2007 | Nicholson |
| 2008/0003033 A1 * | 1/2008 | Aizawa ................. G06F 3/1285 |
| | | 400/62 |

\* cited by examiner

300

| COMPONENT | PEAK (W) | STEADY-STATE (W) | DS 1 | DS 1 | DS 2 | ... | DEVICE STATE N |
|---|---|---|---|---|---|---|---|
| A | 80 | | X | X | X | | |
| A | | 40 | | | | | X |
| B | 100 | | | | | | X |
| B | | 30 | | X | X | | |
| C | 500 | | | X | | | |
| C | | 500 | X | X | X | | X |
| D | 500 | | | | | | |
| D | | 500 | X | | | | |
| E | 1000 | | | X | | | |
| E | | 720 | | | | | |
| F | 900 | | | | X | | |
| F | | 580 | X | | | | X |
| G | 50 | | | | | | |
| G | | 20 | | | X | | |
| ⋮ | | | | | | | |
| M | 40 | | | | | | |
| M | | 30 | X | X | | | |
| TOTAL POWER (W) | | | TP 1 | TP 2 | TP 3 | TP 4 | TP N |

*FIG. 3*

POWER DELIVERY SMOOTHING IN DEVICE STATE TRANSITIONS

BACKGROUND

Printing images or text on printable media in a printer includes various media processing activities, including pick-up, delivery to a print engine, printing, and conditioning of sheets of printable media. Conditioning may involve heating and pressing the sheets through or past a heated conveying component, such as a heated pressure roller (HPR), to remove liquid (for printers using liquid ink), to remove wrinkles or curvature, and/or to reform or flatten fibers in the sheets. Other examples of conditioners may include a resistive dryer and a heating lamp.

BRIEF DESCRIPTION OF DRAWINGS

Features of the present disclosure are illustrated by way of example and not limited in the following figure(s), in which like numerals indicate like elements, in which:

FIG. 3 shows an example lookup table that a processor may access to select a candidate device state;

DETAILED DESCRIPTION

Figure 1A:
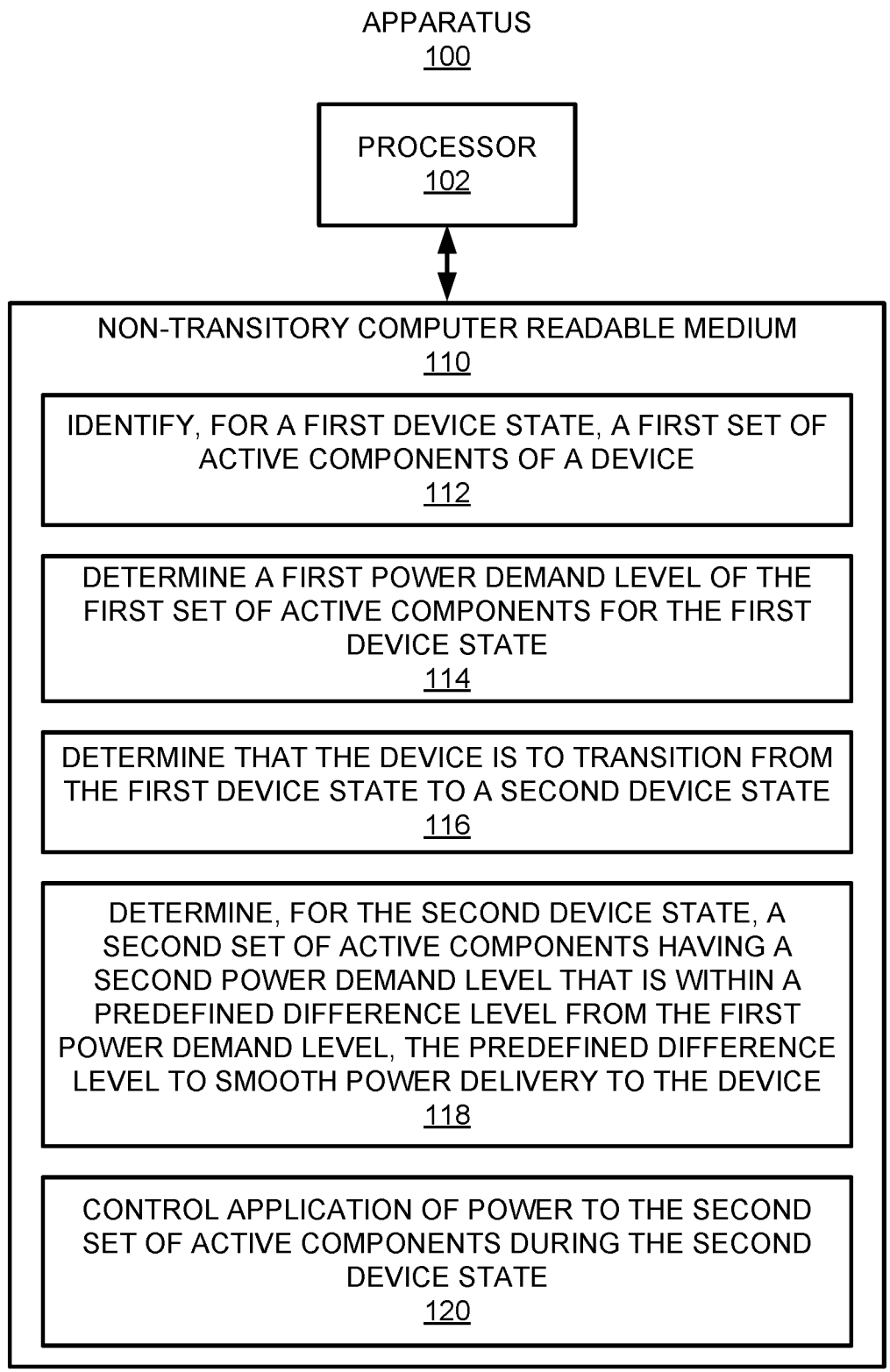
FIG. 1A depicts a block diagram of an example apparatus that may determine a set of active components of a device having a power demand that is within a predefined difference level of a first power demand level to smooth power delivery to the device between a state transition of the device.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Many printers, such as inkjet printers, may include a heated system that may help reduce, among other things, media curl and ink smear, and may improve quality in printed output. The heated systems may include conditioning mechanisms such as dryers, fusers, pressure rollers, calendaring rollers, etc. Heated systems may include a heat generating device that, when a media is to be conditioned may be supplied with a maximum amount of available power to quickly ramp up the temperature in the heated system to a target temperature. By supplying the maximum amount of available power during the ramp up period, the temperature may be increased to the target temperature in a minimized length of time. Following the ramp up period, the temperature in the heated system may be maintained at or near the target temperature for a duration of a print job, e.g., during a steady state operation period using a maintenance control signal that may have a lower application of power.

Printers may include various components, including the heating systems, that may consume power. The various components may include, for example, a print mechanism, a print bar, a dryer, a lamp, a fan, and the like. The power loads of the printers may include a plurality of high power loads to print onto media, condition printed media, meet desired page attributes and job stack quality, etc. The total power available may be determined based on the voltage of the power source. In certain instances, the power loads may interact in ways that may cause a surge in current in an alternating current (AC) power line. The surge in current in the AC power line may cause an uneven or choppy delivery of power to the components of a printer. The uneven or choppy delivery of power may cause lights that are connected to the AC power line to flicker, for example. This may occur, for instance, due to changes in loads during different printer states, e.g., when the printer transitions from performing a printing operation to a conditioning operation. In addition, or alternatively, the uneven or choppy delivery of the power to the components of the printer may negatively affect power line harmonics and conducted electro-magnetic compatibility (EMC) emissions.

Disclosed herein are apparatuses, heated systems, methods, and machine readable instructions that may smooth the delivery of power (e.g., may reduce flicker caused by fluctuations in the current, and thus power, applied) to components of a device, such as a printer. That is, features of the present disclosure may include a processor that may smooth the power delivery (e.g., reduce flicker) by reducing or minimizing differences in power demands in transitions between different device states. For instance, the processor may determine a set of components that are to be active following a transition such that the determined set of components may have a power demand level that is most nearly identical to the power demand level of a set of components prior to the transition. The different device states may include, for instance, a first device state in which the device, e.g., a printer, is performing a printing operation on a media and a second device state in which the device is performing a conditioning operation on the printed media.

According to examples, the processor may determine a first power demand level of a first set of active components for a first device state. The processor may determine, for a second device state to which the device is to transition from the first device state, a second set of active components that have a second power demand level that is within a predefined difference level of the first power demand level, the predefined difference level to smooth power delivery to the device between the first device state to the second device state. The predefined difference level may be defined as a smallest difference or a percentage difference level that includes active components that are mandatory for the second device state. In some examples, an optional component may not be included in the second set of components to make the second power demand level be within the predefined difference level. In other examples, an optional component may be included in the second set of components to make the second power demand level be within the predefined difference level.

Through implementation of the features disclosed herein, power may be delivered in a relatively smooth manner such that, for instance, visible effects of a dynamic load on an AC line on which a device is connected, may be reduced. As a result, for instance, implementation of the features disclosed herein may enable compliance with various power-line flicker regulations.

Throughout the present disclosure, the terms "a" and "an" are intended to denote one of a particular element or multiple ones of the particular element. As used herein, the term "includes" means includes but not limited to, the term "including" means including but not limited to. The term "based on" may mean based in part on.

Figure 1B:
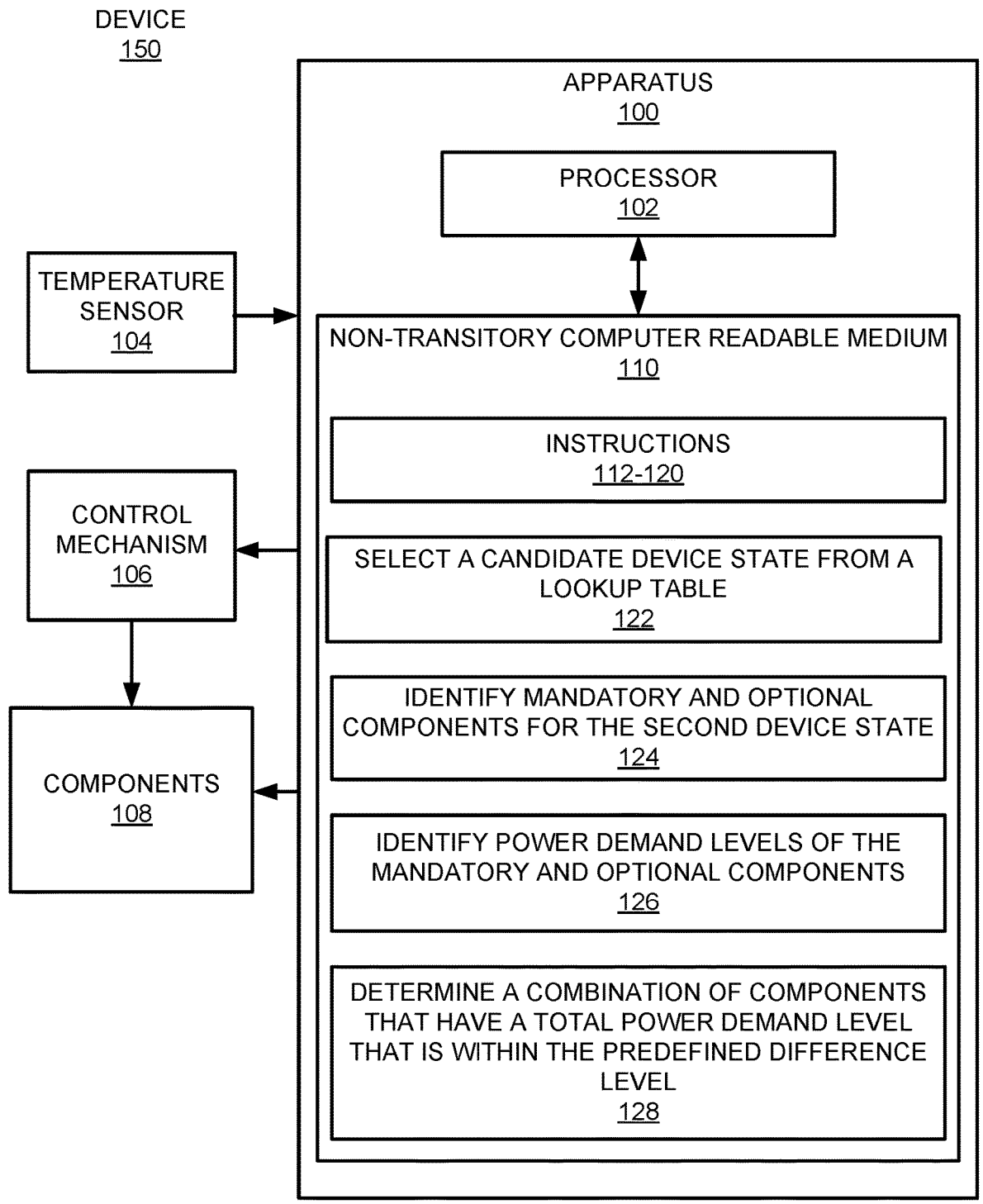
FIG. 1B depicts a block diagram of an example device that may include the apparatus depicted in FIG. 1A, in which the apparatus may control application of power to a plurality of components of the device.
Figure 2:
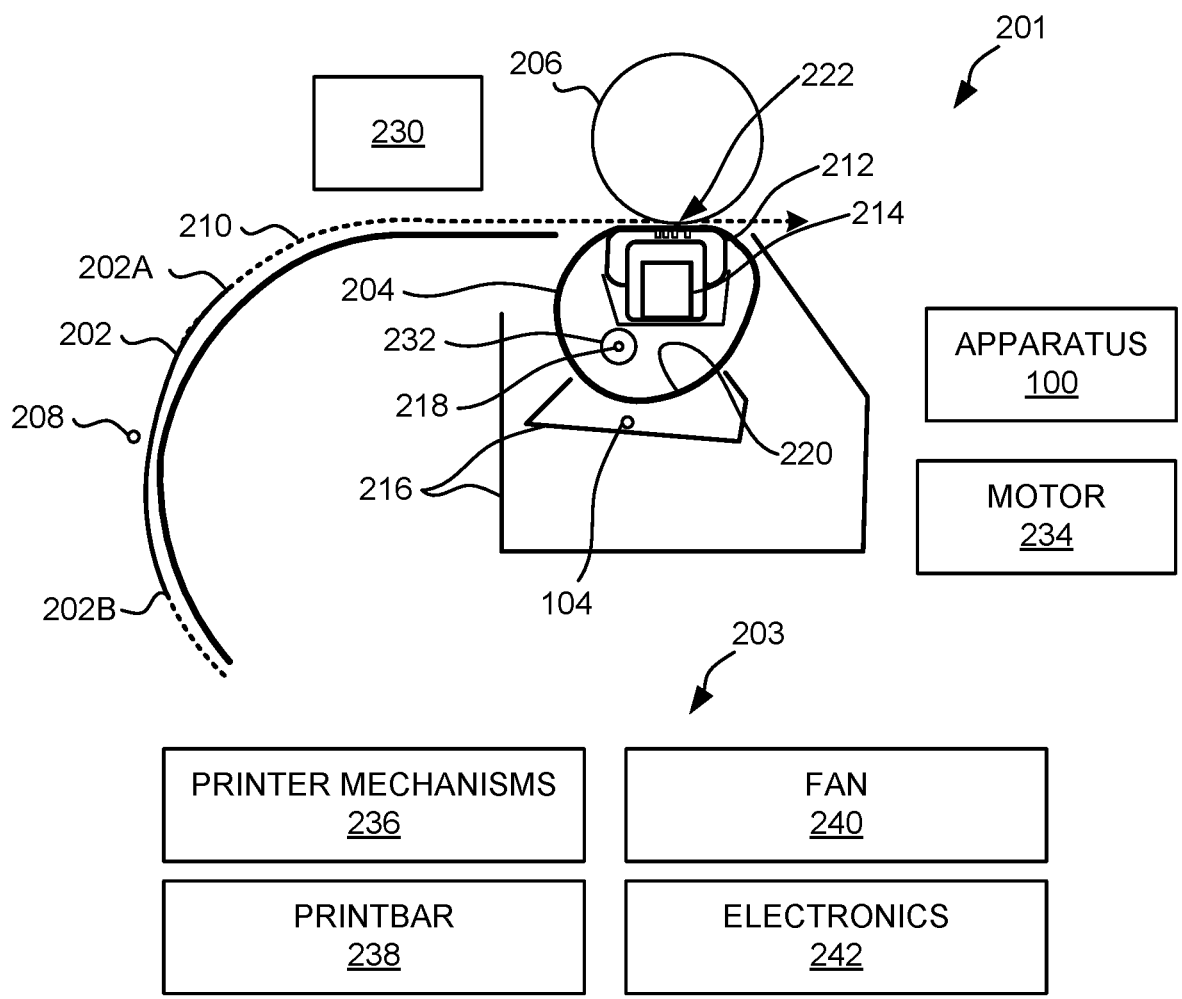
FIG. 2 shows a schematic diagram of an example device that may include the apparatus depicted in FIGS. 1A and/or 1B.

Reference is first made to FIGS. 1A, 1B, and 2. FIG. 1A shows a block diagram of an example apparatus 100 that may determine a set of active components of a device having a power demand that is within a predefined difference level of a first power demand level to smooth power delivery to the device between a first device state and a second device state. FIG. 1B shows a block diagram of an example device 150 that may include the apparatus 100 depicted in FIG. 1A, in which the apparatus 100 may control application of power to a plurality of components 108 of the device. FIG. 2 shows a schematic diagram of an example device 200 that may include the apparatus 100 depicted in FIGS. 1A and/or 1B.

It should be understood that the example apparatus 100 depicted in FIG. 1A and/or the example devices 150 and 200 depicted in FIGS. 1B and 2 may include additional features and that some of the features described herein may be removed and/or modified without departing from the scope of the apparatus 100 and/or the devices 150, 200. In addition, it should be understood that the example device 200 may have a configuration other than the configuration shown in FIG. 2.

Generally speaking, the apparatus 100 may be a computing apparatus, e.g., a personal computer, a laptop computer, a tablet computer, a smartphone, or the like. In these examples, the apparatus 100 may be separate from a device 150, 200 and may communicate instructions to the component 108 of the device 150, 200 over a direct or a network connection. In other examples, the apparatus 100 may be part of the device 150, 200. In these examples, the apparatus 100 may be part of a control system of the device 150, 200 and may communicate instructions to components of the device 150, 200, for instance, over a communication bus.

According to examples, the device 150, 200 may be a printing system that may include a heated system 201 to condition an object, such as a sheet of media, on which a printing medium, e.g., ink, toner, or the like, has been applied by a printer 203. That is, for instance, the device 150, 200 may include a heated system 201 that may be positioned downstream of a print engine of the printer 203. In other examples, the heated system 201 may be implemented to condition other types of objects, e.g., 3D printed objects, painted objects, or the like.

As shown in FIGS. 1B and 2, the devices 150, 200 may include a plurality of components 108 to which the processor 102 may control the application of power. The components 108 may include, for instance, a resistive dryer 230, a heated lamp 232, a motor 234 for the heated system 201, printer mechanisms 236, a printbar 238, a fan 240, and electronics 242. The components 108 may also include respective pluralities of the resistive dryer 230, the heated lamp 232, the motor 234, the printbar 238, and/or the fan 240.

In examples, the printer 203 may print printing liquid onto a sheet of media 202 and the heating lamp 232 and the resistive dryer 230 may heat the printed sheet of media 202. For instance, the heated system 201 may include a first conveying component coupled to engage a second conveying component to receive, contact, heat, and convey the sheet of media 202. In this example, the first conveying component may be a heated belt 204 and the second conveying component may be a driven roller 206, which may be driven to rotate by a motor (not shown).

The heated system 201 may also include a media sensor 208 disposed along a media path 210, a platen 212, and a platen support structure 214 to support and guide the belt 204, and a chassis 216. In width, the belt 204, roller 206, platen 212 and the platen support structure 214 may extend "into the page" of FIG. 2. The media sensor 208 may sense and generate a signal in response to a sheet of printable media 202 being proximal the media sensor 208. The media 202 may be moving or may be stationary. The sheet of media 202 may be located on the media path 210 within the sensing range of the media sensor 208. The sheet of media 202 may include a leading edge 202A and a trailing edge 202B, named based on the intended direction of travel of the sheet of media 202. The leading edge 202A may be located beyond the media sensor 208, and the trailing edge 202B has not yet reached the media sensor 208. The media sensor 208 may detect the leading edge 202A, the trailing edge 202B, or the body of the sheet of media 202 between the edges 202A, 202B.

The heating lamp 232 may be a radiant heater, which may include a heating element 218. The heating lamp 232 may extend within the belt 204 to heat a heating zone 220 of the belt 204 by thermal radiation. The heating zone 220 may include the portions of the belt 204 that are in the field of view of the heating lamp 232 at any given moment in time. In various examples, the heated system 201 may include multiple heating lamps 232, which may be designed and arranged to heat different portions of the belt 204. During operation, the roller 206 may conductively be heated by contact with the belt 204, and a length or a piece of media 202, when present, may be heated by contact with the belt 204 and the roller 206. In some examples, the heating lamp 232 may be disposed outside of the belt 204. The heating element 218 may be a halogen-type lamp, but other types of lamps or other types of heating elements may be used to heat the belt 204 and/or the roller 206.

The belt 204 and the roller 206 may contact and press against each other along a nip region 222 to receive and convey the media 202. The nip region 222 may extend along the shared width of the belt 204 and the roller 206. During operation, rotational movement of the roller 206 may drive the belt 204 to rotate by friction or by gearing, with or without media, in between the roller 206 and the belt 204. In addition, the temperature sensor 104 may monitor the temperature of the belt 204 to facilitate control by the processor 102 of the heating lamp 232. The temperature sensor 104 may be a non-contacting thermistor located outside and below the belt 204. Although a single temperature sensor 104 is depicted in FIGS. 1B and 2, additional sensors may be disposed at different locations along the width of the belt 204. Other examples may include another form of non-contact temperature sensor or may include a contact temperature sensor located in another appropriate position.

The resistive dryer 230 may generate heat that may be directed to the sheet of media 202 as the media 202 is fed to further condition the media 202. The resistive dryer 230 may include a resistive element that may become heated as a voltage is applied across the resistive element.

The apparatus 100 may control the application of power to the components 108, including the heating lamp 232 and the resistive dryer 230. By way of example, the apparatus 100 may determine that the heated system 201 is to be implemented to apply heat to an object, for instance, a sheet of media 202. The apparatus 100 may make this determination based on receipt of an instruction from a processor in a printing device, based on receipt of a signal from the media sensor 208, or the like. Based on the determination, the apparatus 100 may initiate supply of power to the heating lamp 232 for a period of time and may initiate supply of power to the resistive dryer 230.

The apparatus 100 may directly control the supply of power to the components 108, e.g., without implementing the control mechanism 106. In addition, although the control mechanism 106 is depicted as being separate from the apparatus 100, in some examples, the control mechanism 106 may be integral with the apparatus 100. That is, for instance, the control mechanism 106 may be a feedback controller that the apparatus 100 may execute or implement.

As shown in FIGS. 1A and 1B, the apparatus 100 may include a processor 102, which may control operations of the apparatus 100. The processor 102 may be a semiconductor-based microprocessor, a central processing unit (CPU), an application specific integrated circuit (ASIC), a field-programmable gate array (FPGA), graphics processing unit (GPU), a tensor processing unit (TPU), and/or other suitable hardware device. The apparatus 100 may also include a non-transitory computer readable medium 110 that may have stored thereon machine readable instructions 112-128 (which may also be termed computer readable instructions) that the processor 102 may execute. The non-transitory computer readable medium 110 may be an electronic, magnetic, optical, or other physical storage device that contains or stores executable instructions. The non-transitory computer readable medium 110 may be, for example, Random Access memory (RAM), an Electrically Erasable Programmable Read-Only Memory (EEPROM), a storage device, an optical disc, and the like. The term "non-transitory" does not encompass transitory propagating signals.

The processor 102 may fetch, decode, and execute the instructions 112 to identify, for a first device state, a first set of active components 108 of a device. The first device state may be a first operational state of the device 150, 200. For instance, the first device state may be a state in which the printer 203 is printing onto a sheet of media 202. In this example, the processor 102 may apply power to the components 108 that may be active during the printing of the sheet of media 202. The active components 108 for the first device state may include printer mechanisms 236, e.g., motors, encoders, etc., the printbar 238, the fan 240, and the electronics 242. The electronics 242 may include various electronic components, e.g., circuits, etc., that may be applied with power during a printing operation.

The processor 102 may fetch, decode, and execute the instructions 114 to determine a first power demand level of the first set of active components for the first device state. That is, for each of the active components for the first device state, the processor 102 may determine a respective power demand level, or equivalently, a power draw level, and may sum the respective power demand levels to determine the first power demand level.

The processor 102 may fetch, decode, and execute the instructions 116 to determine that the device 150, 200 is to transition from the first device state to a second device state. By way of example, the second device state may be an operational state of the device 150, 200 in which the heated system 201 is to condition a printed sheet of media 202. In other examples, the second device state may be another operational state of the device 150, 200, e.g., a state in which the printer 203 is to print another sheet of media, a state in which the printer 203 is to scan a media, or the like.

The processor 102 may fetch, decode, and execute the instructions 118 to determine, for the second device state, a second set of active components 108 having a second power demand level that is within a predefined difference level of the first power demand level. The predefined difference level of the first power demand level may be a power demand difference that is sufficiently small to cause the power delivery to the device 150, 200 to be smooth during a transition from the first device state to the second device state. The delivery of power to the device 150, 200 may be considered as being smooth when the power demand difference is within a predefined difference level. By way of example, the power demand difference may be considered as being smooth when the power demand difference is sufficiently small to cause a flicker resulting from the device state transition to be minimized. By way of example, the processor 102 may determine the second set of active components 108 to include components for which the power demand level is approximately equal to the first power demand level. As another example, the predefined difference level may have a power demand difference that is within a percentage difference, e.g., 5%, 10%, etc. In any regard, the predefined difference level may be determined through testing, modeling, or the like.

According to examples, the processor 102 may determine which of the components 108 may be active for the second device state, e.g., which of the components 108 are to receive power in order for the device 150, 200 to function in the second device state. In addition, the processor 102 may determine the power demand level of the components 108 that are to be active during the second device state. Particularly, for instance, each of the components 108 in the second set of active components may be defined to receive respective power levels and the processor 102 may determine the power demand level from the respective power levels. For instance, a resistive dryer 230 may be rated to receive a peak power level of 500 W and a steady-state power level of 500 W. As another example, a heating lamp 232 may be rated to receive a peak power level of 1000 W and a steady-state power level of 720 W. As a further example, a printbar 238 may be rated to receive a peak power level of 100 W and a steady-state power level of 30 W.

The processor 102 may determine the components 108 that are to be active during the second device state based on the power demand level of the components 108. By way of example, the processor 102 may determine that multiple potential combinations of components 108 may be active during the second device state. The processor 102 may determine the power demand levels of each of the multiple potential combinations of components 108 and may select the combination of components 108 having a power demand level that is within the predefined difference level of the first power demand level. Particularly, the processor 102 may select the combination of components 108 having a power demand level that most closely matches the first power demand level.

The processor 102 may fetch, decode, and execute the instructions 120 to control application of power to the second set of active components 108, for instance, according to the respective rated power levels of the components 108. That is, the processor 102 may control a power source to supply power to the components 108 at the respective rated power levels of the components 108. In this regard, the device 150, 200 may include individual switches or other mechanisms (not shown) connected to the components 108 through which the processor 102 may control the application of power to the respective components 108.

According to examples, the processor 102 may fetch, decode, and execute the instructions 122 to select a candidate device state from a plurality of candidate device states that meets the second device state and is within the predefined difference level of the first power demand level from a lookup table to determine the second set of active components 108. In these examples, the processor 102 may access a lookup table that correlates a plurality of candidate device states with respective sets of active components 108 for the candidate device states and identifies power demand levels corresponding to each of the plurality of candidate device states. An example of a lookup table 300 that the processor 102 may access to select a candidate device state, e.g., a set of active components 108 for the second device state, is depicted in FIG. 3.

As shown in FIG. 3, the lookup table 300 may identify a plurality of components labeled A-M, in which the variable "M" may represent a value greater than one. The components may correspond to the components 108 discussed herein. The lookup table 300 may also identify the rated peak and steady-state power levels of the components. Each of the components is identified twice in the lookup table 300 such that the components may be listed according to each of their rated peak and steady-state power levels. The lookup table 300 may also list a plurality of device states (DS) 1 to N, in which the variable "N" may represent a value greater than one. As shown, in each of the device states, some of the components A-M may be selected to receive power at one of the peak power levels or the steady-state power levels of the components.

In addition, the lookup table 300 may include multiple candidate versions of the same device state. In this regard, for instance, the lookup table may show different combinations of components that may be active for a particular device state, e.g., to perform a particular device operation. For instance, in conditioning the printed sheet of media 202, both a resistive dryer 230 and a heating lamp 232 may be active, but a fan 240 and/or the electronics 242 may not be active. In one of the candidate device states, the fan 240 may also be active but the electronics 242 may not be active. In another one of the candidate device states, the fan 240 may not be active, but the electronics 242 may be active.

The lookup table 300 may also identify the total power demand levels (TP 1 to TP N) of the respective device states. The total power demand levels may correspond to respective total power demand levels of the active components 108 in the device states.

According to examples, the processor 102 may use the lookup table 300 to identify a candidate device state that meets the second device state, e.g., puts the device 150, 200 into a state to perform a predefined operation, while being within the predefined difference level of the first power demand level. For instance, the processor 102 may identify the candidate device state listed in the lookup table 300 that has a power demand level that is most near the first power demand level. In some instances, the power demand level of the selected candidate device state may be higher than the power demand level of an unselected candidate device state that meets the second device state.

According to examples, the processor 102 may fetch, decode, and execute the instructions 124 to identify components 108 of the device 150, 200 that are mandatory and components 108 of the device 150, 200 that are optional for the second device state. The mandatory components 108 may be those components 108 for which an operation corresponding to the second device state may not be implemented without the components 108 and the optional components 108 may be those components 108 that may optionally be implemented for the operation corresponding to the second device state. By way of example in which the second device state corresponds to a printed media 202 conditioning operation, the mandatory components may include the resistive dryer 230, the heating lamp 232, and the motor 234 and the optional components may include the fan 240 and the printbar 238.

According to examples, the processor 102 may fetch, decode, and execute the instructions 126 to identify power demand levels of the mandatory and optional components for the second device state. The processor 102 may identify the power demand levels of the components 108 from, for instance, a lookup table that identifies the power demand levels, from a servo in communication with the components 108, etc. In addition, the processor 102 may fetch, decode, and execute the instructions 128 to determine a combination of mandatory and optional components 108 that have a total power demand level that is within the predefined difference level of the first power demand level.

In some examples, the mandatory components and/or the optional components may be prioritized in terms of their relative importance. In these examples, to determine the combination of mandatory and optional components 108 that have a total power demand level that is within the predefined difference level of the first power demand level, the processor 102 may determine, for instance, through implementation of an algorithm, the combination that includes the highest priority mandatory and/or optional components.

In addition, the processor 102 may execute the instructions 120 to control application of power to the determined combination of mandatory and optional components 108 that have a total power demand level that is within the predefined difference level of the first power demand level (e.g., the second set of active components 108).

In examples, the processor 102 may recursively balance power applied to the active components to smooth power delivery, e.g., reduce flicker that may be caused between device state transitions. Thus, for instance, the processor 102 may recursively lookup candidate device states in the lookup table 300 and/or may recursively calculate combinations of active components that may result in smoother power demand fluctuations between device state transitions.

Instead of the machine readable instructions 112-128, the apparatus 100 may include hardware logic blocks that may perform functions similar to the instructions 112-128. In other examples, the apparatus 100 may include a combination of instructions and hardware logic blocks to implement or execute functions corresponding to the instructions 112-128. In any of these examples, the processor 102 may implement the hardware logic blocks and/or execute the instructions 112-128. As discussed herein, the apparatus 100 may also include additional instructions and/or hardware logic blocks such that the processor 102 may execute operations in addition to or in place of those discussed above with respect to FIGS. 1A and 1B.

Figure 4:
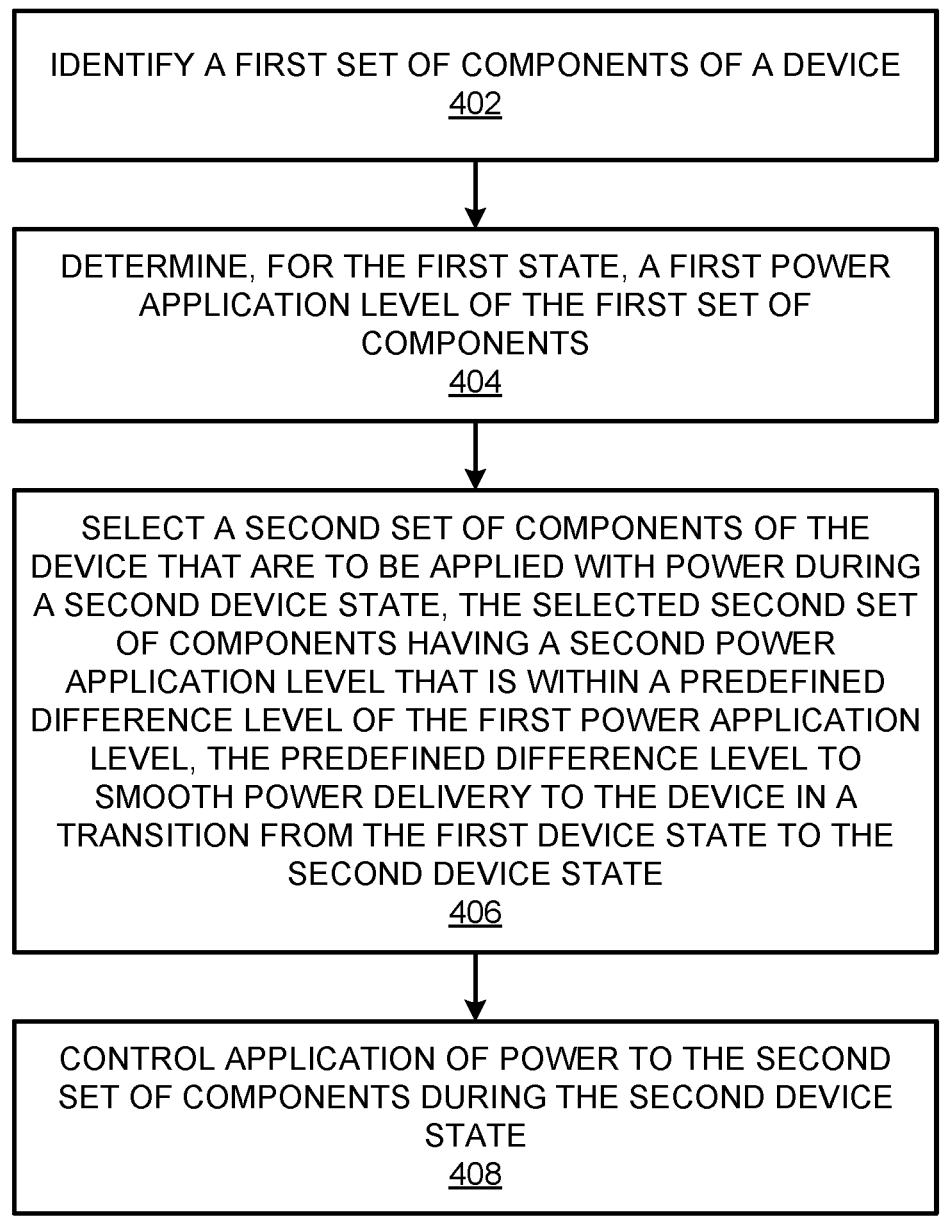
FIG. 4 depicts a flow diagram of an example method for smoothing power delivery in a transition from a first device state to a second device state.

Various manners in which the processor 102 may operate are discussed in greater detail with respect to the method 400 depicted in FIG. 4. Particularly, FIG. 4 depicts a flow diagram of an example method 400 for smoothing power delivery in a transition from a first device state to a second device state. It should be understood that the method 400 depicted in FIG. 4 may include additional operations and that some of the operations described herein may be removed and/or modified without departing from the scope of the method 400. The description of the method 400 is made with reference to the features depicted in FIGS. 1A-3 for purposes of illustration.

At block 402, the processor 102 may identify a first set of components 108 of a device 150, 200 that are to be applied with power during a first device state. As discussed herein, the first device state may be a first operational state of the device 150, 200, in which some of the components 108 of the device 150, 200 may be active.

At block 404, the processor 102 may determine, for the first device state, a first power application level of the first set of components 108. That is, for each of the active components for the first device state, the processor 102 may determine a respective power application level, or equivalently, a power demand or draw level, and may sum the respective power application levels to determine the first power application level.

At block 406, the processor 102 may select a second set of components 108 of the device 150, 200 that are to be applied with power during a second device state. The selected second set of components 108 may have a second power application level that is within a predefined difference level of the first power application level, in which the predefined difference level may smooth power delivery to the device in a transition from the first device state to the second device state. That is, the processor 102 may select the second set of components 108 such that the power application levels between the first device state and the second device state may be similar to each other. As a result, the power application levels during the transition from the first device state and the second device state may be relatively smooth, which may result in a relatively small flicker or a minimized flicker.

In some examples, the processor 102 may identify components 108 of the device 150, 200 that are mandatory for the second device state and components 108 of the device 150, 200 that are optional for the second device state. In addition, the processor 102 may identify power demand levels of the mandatory and optional components for the second device state and may identify an optional component to be inactive in the second device state. The processor 102 may further determine a combination of the mandatory and optional components 108 that have a total power application level that is within the predefined difference level of the first power application level (e.g., the second set of active components 108).

According to examples, the processor 102 may access a lookup table 300 that correlates a plurality of candidate device states with respective sets of components for the candidate device states and identifies power application levels corresponding to each of the plurality of candidate device states. In addition, the processor 102 may select a candidate device state of the plurality of candidate device states that meets the second device state and is within the predefined difference level of the first power application level from the lookup table 300 to determine the second set of active components 108.

At block 408, the processor 102 may control application of power to the second set of components during the second device state. That is, for instance, the processor 102 may control application of power to the second set of components according to the respective rate power levels of the components in the second set of components.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is, therefore, to be understood that any electronic device capable of executing the above-described functions may perform those functions enumerated above.

Figure 5:
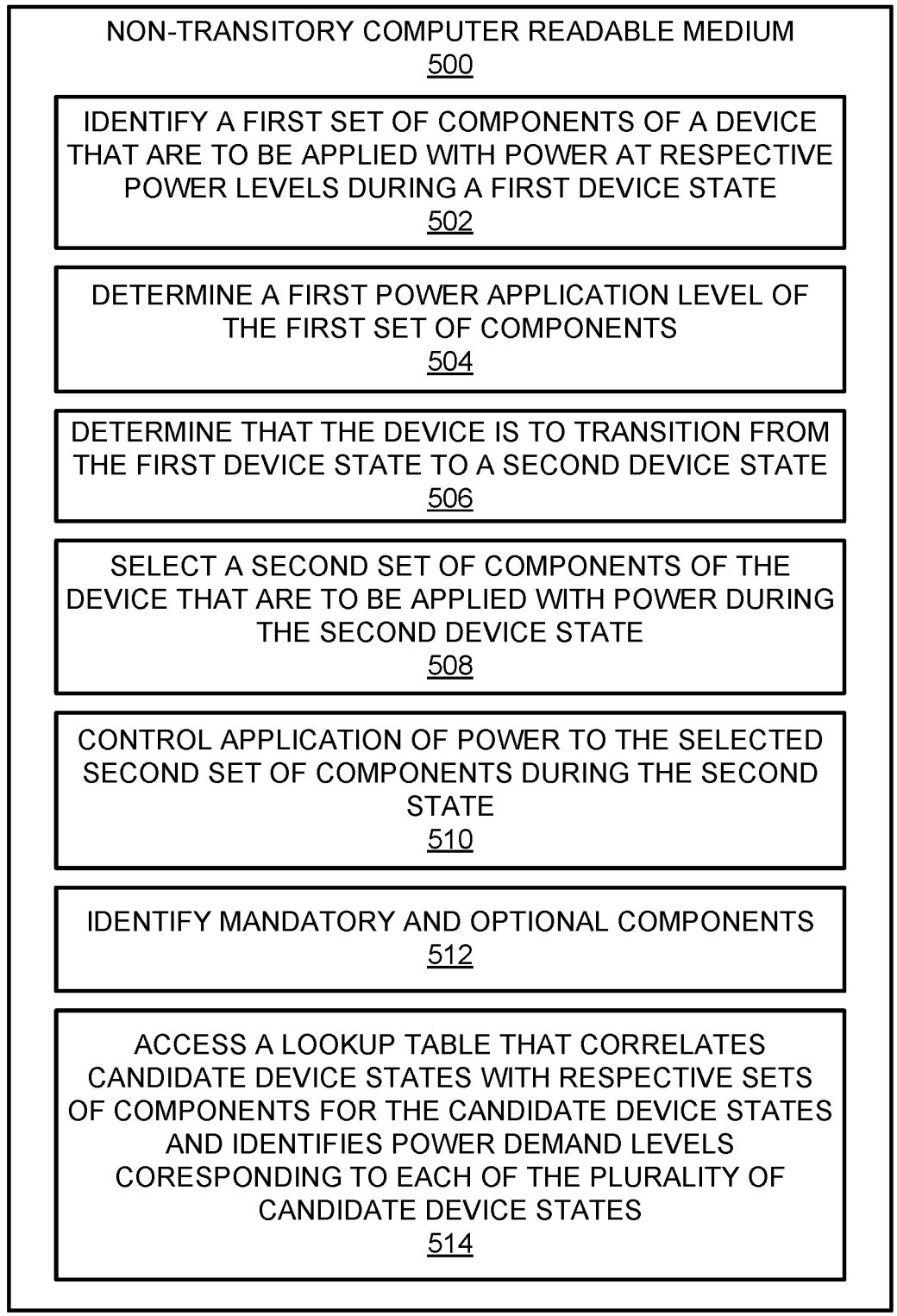
FIG. 5 shows an example non-transitory computer readable medium for smoothing power delivery in a transition from a first device state to a second device state.

Turning now to FIG. 5, there is shown an example non-transitory computer readable medium 500 for smoothing power delivery in a transition from a first device state to a second device state. The non-transitory computer readable medium 500 may be an electronic, magnetic, optical, or other physical storage device that contains or stores executable instructions. The computer readable medium 500 may be, for example, Random Access memory (RAM), an Electrically Erasable Programmable Read-Only Memory (EEPROM), a storage device, an optical disc, and the like.

The non-transitory computer readable storage medium 500 may have stored thereon machine readable instructions 502-514 that a processor, e.g., the processor 102, may execute. The machine readable instructions 502 may cause the processor to identify a first set of components 108 of a device 150, 200 that are to be applied with power at respective power levels during a first device state. The machine readable instructions 504 may cause the processor to determine, for the first device state, a first power application level of the first set of components 108. The machine readable instructions 506 may cause the processor to determine that the device 150, 200 is to transition from the first device state to a second device state. The machine readable instructions 508 may cause the processor to select a second set of components 108 of the device 150, 200 that are to be applied with power during the second device state, the selected second set of components 108 having a second power application level that is within a predefined difference level of the first power application level, the predefined difference level to smooth power delivery in a transition from the first device state to the second device state. The machine readable instructions 510 may cause the processor to control application of power to the selected second set of components 108 during the second device state.

In some examples, the machine readable instructions 512 may cause the processor to identify components of the device that are mandatory for the second device state and components of the device that are optional for the second device state. In addition, the processor may identify an optional component to be inactive in the second device state. Moreover, the machine readable instructions 508 may cause the processor to select the second set of components for the second device state to include the components identified as being mandatory for the second device state and to omit the optional component identified to be inactive.

In some examples, the machine readable instructions 514 may cause the processor to access a lookup table that correlates a plurality of candidate device states with respective sets of components for the candidate device states and identifies power demand levels corresponding to each of the plurality of candidate device states. In addition, the machine readable instructions 514 may cause the processor to select a candidate device state of the plurality of candidate device states that meets the second device state and is within the predefined difference level of the first power demand level from the lookup table to determine the second set of components.

Although described specifically throughout the entirety of the instant disclosure, representative examples of the present disclosure have utility over a wide range of applications, and the above discussion is not intended and should not be construed to be limiting but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor, cause the processor to:
   identify, for a first device state, a first set of active components of a device;
   determine a first power demand level of the first set of active components for the first device state;
   determine that the device is to transition from the first device state to a second device state;
   determine, for the second device state, a second set of active components of the device having a second power demand level that is within a predefined difference level of the first power demand level, the predefined difference level to smooth power delivery to the device between the first device state and the second device state; and
   control application of power to the second set of active components during the second device state.

2. The apparatus of claim 1, wherein the instructions are further to cause the processor to:
   control application of power to the second set of active components during the second device state according to predefined power levels of the active components in the second set of active components.

3. The apparatus of claim 1, wherein the instructions are further to cause the processor to:
   identify mandatory components of the device that are mandatory for the second device state and optional components of the device that are optional for the second device state;
   identify an optional component of the identified optional components to be inactive in the second device state; and
   determine the second set of active components for the second device state to include the identified mandatory components and to omit the identified optional component.

4. The apparatus of claim 3, wherein the instructions are further to cause the processor to:
   identify power demand levels of the identified mandatory components and the identified optional components in the second device state;
   determine a total power demand level of the identified mandatory components; and
   determine a combination of the identified optional components having a combined power demand level that when summed with the total power demand level of the mandatory components is within the predefined difference level of the first power demand level.

5. The apparatus of claim 1, wherein the instructions are further to cause the processor to:
   access a lookup table that correlates a plurality of candidate device states with respective sets of active components for the candidate device states and identifies power demand levels corresponding to each of the plurality of candidate device states; and
   select a candidate device state of the plurality of candidate device states that meets the second device state and is within the predefined difference level of the first power demand level from the lookup table to determine the second set of active components.

6. The apparatus of claim 5, wherein the instructions are further to cause the processor to:
   determine that multiple candidate device states of the plurality of candidate device states meet the second device state, the multiple candidate device states identifying different sets of active components; and
   select the candidate device state of the multiple candidate device states that corresponds to a power demand level that has a smallest difference from the first power demand level.

7. The apparatus of claim 6, wherein the different sets of active components of the multiple candidate device states that meet the second device state include common mandatory components and different optional components with respect to each other.

8. The apparatus of claim 1, wherein the instructions are further to cause the processor to determine the second set of active components based on each active component in the second set of active components being applied with power at a peak power level or a steady-state power level of the active component.

9. A method comprising:
   identifying, by a processor, a first set of components of a device that are to be applied with power during a first device state;
   determining, by the processor and for the first device state, a first power application level of the first set of components;
   selecting, by the processor, a second set of components of the device that are to be applied with power during a second device state, the selected second set of components having a second power application level that is within a predefined difference level of the first power application level, the predefined difference level to smooth power delivery to the device in a transition from the first device state to the second device state; and
   controlling, by the processor, application of power to the second set of components during the second device state.

10. The method of claim 9, further comprising:
    identifying mandatory components of the device that are mandatory for the second device state and optional components of the device that are optional for the second device state;
    identifying an optional component of the optional components to be inactive in the second device state; and
    selecting the second set of components for the second device state to include the identified mandatory components and to omit the identified optional component.

11. The method of claim 10, further comprising:

identifying power application levels of the mandatory components and the optional components in the second device state;

determining a total power application level of the mandatory components; and determining a combination of the optional components having a combined power application level that when summed with the total power application level of the mandatory components is within the predefined difference level of the first power application level.

12. The method of claim 9, further comprising:

accessing a lookup table that correlates a plurality of candidate device states with respective sets of components for the candidate device states and identifies power application levels corresponding to each of the plurality of candidate device states; and selecting a candidate device state of the plurality of candidate device states that meets the second device state and is within the predefined difference level of the first power application level from the lookup table to determine the second set of components.

13. A non-transitory computer-readable medium comprising machine readable instructions that when executed by a processor cause the processor to:

identify a first set of components of a device, each of the components in the first set to be applied with power at a predefined power level during a first device state;

determine, for the first device state, a first power application level of the first set of components;

determine that the device is to transition from the first device state to a second device state;

select a second set of components of the device that are to be applied with power during the second device state, the selected second set of components having a second power application level that is within a predefined difference level of the first power application level, the predefined difference level to smooth power delivery to the device during a transition from the first device state to the second device state; and control application of power to the selected second set of components during the second device state.

14. The non-transitory computer-readable medium of claim 13, wherein the instructions are further to cause the processor to:

identify mandatory components of the device that are mandatory for the second device state and optional components of the device that are optional for the second device state;

identify an optional component of the optional components to be inactive in the second device state; and select the second set of components for the second device state to include the mandatory components and to omit the optional component.

15. The non-transitory computer-readable medium of claim 13, wherein the instructions are further to cause the processor to:

access a lookup table that correlates a plurality of candidate device states with respective sets of components for the candidate device states and identifies power demand levels corresponding to each of the plurality of candidate device states; and select a candidate device state of the plurality of candidate device states that meets the second device state and is within the predefined difference level of the first power application level from the lookup table to determine the second set of components.

\* \* \* \* \*